Patented July 13, 1937

2,086,565

UNITED STATES PATENT OFFICE 2,086,565

MAKING CALCIUM PHOSPHATE FERTILIZER

Walter H. MacIntire, Knoxville, Tenn.

No Drawing. Application August 23, 1935,
Serial No. 37,532

8 Claims. (Cl. 71—37)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to a process of making calcium phosphate fertilizer, particularly by the treatment of calcium-containing materials with a dilute mineral acid.

One of the objects of this invention is to utilize dilute phosphoric acid as produced by the wet method in making phosphatic fertilizer without a further prior concentration of the acid. Another object of this invention is to provide an efficient and economical means for the production of phosphatic fertilizers, using dilute phosphoric acid, which does not require either filtration, evaporation, or both, for the removal of the excess water contained in the dilute acid. Other objects of this invention include the use of a material in the formation of phosphatic fertilizers, which when reacted upon by dilute mineral acid results in the formation of a component in the reaction mixture, which component exerts a definite desiccating effect upon the mixture.

Calcium-containing materials may be treated with concentrated phosphoric acid to produce phosphatic fertilizers without appreciable processing to remove the water contained in the acid. On the other hand, dilute phosphoric acid of the maximum concentration that can be produced by the so-called wet process has not been used unless the very expensive step of concentration by the evaporation of the excess water contained in the dilute acid has been effected. Otherwise, the presence of the excess water in the dilute acid makes it necessary to evaporate this excess water from the reaction mixtures or their filtrates.

I have discovered a process of treating calcium-containing materials with dilute mineral acid, of the concentration normally used or produced by a wet process, to produce relatively dry phosphatic fertilizers by incorporating a sufficient amount of fine calcium silicate slag in the reaction mixture to effect the desiccation of the mixture.

One example for the production of di-calcium phosphate which lies within the scope of my invention is given as follows: 304 parts by weight of the fine, unquenched slag, 85% through 200 mesh and 65% through 325 mesh, and 735 parts by weight of dilute phosphoric acid solution, containing 40% by weight $H_3PO_4$, are mixed to form a thin slurry and the mixing continued until a plastic mass is produced. After curing the plastic mass for eleven days the apparently dry product contains 32.3% total $P_2O_5$, 7.75% water soluble $P_2O_5$ and 4.51% moisture. After heating this material for forty-four hours at 105° C. the total $P_2O_5$ increases to 37.38%.

A second example for the production of mono-calcium phosphate is given below: 407 parts by weight of Tennessee brown phosphate rock, containing 76.22% tri-calcium phosphate equivalent and 2.9% calcium carbonate equivalent, are mixed with 1235 parts by weight of dilute phosphoric acid, containing 40% by weight of $H_3PO_4$ to form a thin slurry. 81 parts by weight of fine, unquenched slag, 85% through 200 mesh and 65% through 325 mesh, are incorporated with the thin slurry and the mixing continued until the plastic stage is reached. After curing the plastic mass for approximately one month the apparently dry product contains 46.8% total $P_2O_5$, 40.25% water soluble $P_2O_5$, 3.25% citrate insoluble $P_2O_5$, 43.55% available $P_2O_5$ and 4.36% moisture.

A third example for the production of di-calcium phosphate follows: 1204 parts by weight of fine limestone of 200 mesh are mixed with 3680 parts by weight of dilute phosphoric acid, containing 40% by weight of $H_3PO_4$, to form a thin slurry. 304 parts by weight of fine, unquenched slag, 85% through 200 mesh and 65% through 325 mesh, are incorporated in the thin slurry and the mixing continued until the plastic stage is reached. After curing the plastic mass for eight days the apparently dry product contains 39.3% total $P_2O_5$, 5.0% water soluble $P_2O_5$ and 11.05% moisture.

It is evident that there are numerous factors which will influence conditions for the most satisfactory operation of my invention, the actual limits of which cannot be established except by detailed study of each set of raw materials and intermediate and finished products involved.

The calcium-containing material may be any material which is reactive with the dilute mineral acid to form a phosphatic fertilizer. Materials such as phosphate rock, limestone and calcium silicate are particularly suitable for this purpose when dilute phosphoric acid is used, while only phosphate rock is suitable when sulfuric acid alone is used. The dilute phosphoric acid used is of the maximum concentration normally produced by the so-called wet process comprising the treatment of phosphate rock with dilute sulfuric acid and the separation of the calcium sulfate from the dilute phosphoric acid formed. The maximum concentration of this dilute phosphoric acid is ordinarily between 35 to 40% by weight $H_3PO_4$. The dilute sulfuric acid used is of the concentration normally used in connection with the so-called den process and similar processes.

The dilute mineral acid may be either phosphoric acid, sulfuric acid, or mixtures of the two. It is preferable to use dilute phosphoric acid in order that a fertilizer may be produced which contains the maximum amount of available phosphorus. This, however, does not preclude the use of sulfuric acid in the production of low grades of fertilizer material. The dilute phosphoric acid containing at least a concentration of 30% by weight of $H_3PO_4$ may be used satisfactorily in the process disclosed. When the calcium-bearing material is not a silicious material it may be mixed with the dilute phosphoric acid to form a thin slurry. A sufficient quantity of fine calcium silicate to effect the proper desiccating action is mixed with the thin slurry until a plastic state is reached and the plastic mixture is then cured until an apparently dry product results. The amount of the dilute acid used is that required to convert the calcium-bearing material, which comprises the major portion of the material being treated, into the type of calcium phosphate fertilizer being made and that required to convert the calcium silicate, which is added, to dicalcium phosphate when dilute phosphoric acid is used and to calcium sulfate when dilute sulfuric acid is used.

Any mineral or artificial calcium silicate, such as wollastonite, and aluminum, iron and phosphorous reduction furnace by-products, rich in calcium silicate, may be used as the source of the calcium silicate used in my process, either when it is used entirely as the source of the calcium-containing material or used in smaller proportion solely for the purpose of supplying its silica content. In the latter instance the amount of calcium silicate used should be sufficient to effect the proper desiccating action on the reaction mixture. In most instances it has been found that 15 to 25% by weight of the other calcium-bearing material which is treated with the dilute mineral acid is sufficient for this purpose. The smaller proportion of calcium silicate may be mixed with the larger proportion of the calcium-bearing material prior to admixture with the dilute acid but under the conditions which have been investigated it has been found preferable to add the fine calcium silicate to the thin slurry formed by mixing the larger proportion of the calcium-bearing material with the dilute mineral acid. The most satisfactory results are obtained when the calcium silicate is used in a finely ground condition, preferably of such a fineness that the major portion of it passes through a 100 mesh screen. For example, a di-calcium silicate or wollastonite is preferably ground so that the major portion of it passes through a 100 mesh screen while a phosphorus reduction furnace slag is preferably ground so that the major portion of it passes through a 200 mesh screen.

The apparently dry product which is obtained on curing the plastic mass may be used directly or it may be further concentrated by dehydration at a relatively low temperature such as 100 to 105° C.

It will be seen, therefore, that this invention actually may be carried out by the modification of certain details without departing from its spirit or scope.

I claim:

1. Process of making mono-calcium phosphate from a calcium silicate and dilute phosphoric acid which comprises mixing the fine calcium silicate and the dilute phosphoric acid, containing 30 to 40% by weight of $H_3PO_4$, until the thin slurry originally produced passes into a plastic state, the amount of the phosphoric acid being that required to convert the calcium silicate to mono-calcium phosphate; and curing the plastic mixture until an apparently dry product results.

2. Process of making mono-calcium phosphate from phosphate rock, a calcium silicate and dilute phosphoric acid, which comprises mixing the fine phosphate rock and the dilute phosphoric acid, containing 30 to 40% by weight $H_3PO_4$ to produce a thin slurry, the amount of the phosphoric acid used being that required to convert all the phosphate rock into mono-calcium phosphate and to convert the calcium silicate subsequently added into di-calcium phosphate; mixing the fine calcium silicate with the thin slurry until a plastic state is reached, the amount of the calcium silicate slag being between 15 and 25% by weight of the phosphate rock used; and curing the plastic mixture until an apparently dry product results.

3. Process of making calcium phosphate fertilizer from a calcium-containing material, reactive with dilute phosphoric acid to produce the calcium phosphate fertilizer, a calcium silicate and dilute phosphoric acid which comprises mixing the fine calcium-containing material with the dilute phosphoric acid, containing at least 30 to 40% by weight of $H_3PO_4$, to produce a thin slurry, the amount of the phosphoric acid being that required to convert all the calcium-containing material into the available calcium phosphate fertilizer being made and to convert the calcium silicate subsequently added into di-calcium phosphate; mixing the fine calcium silicate with the thin slurry until the plastic state is reached, the amount of the calcium silicate used being sufficient to effect the desiccation of the mixture, and curing the plastic mixture until an apparently dry product results.

4. Process of making calcium phosphate fertilizer from a calcium-containing material, reactive with dilute mineral acid to produce the calcium phosphate fertilizer, a calcium silicate and dilute mineral acid which comprises mixing the fine, calcium-containing material with the dilute mineral acid, selected from the group consisting of phosphoric acid, sulfuric acid and a mixture of phosphoric acid and sulfuric acid, to produce a thin slurry, the amount of the mineral acid being that required to convert all the calcium-containing material into the available phosphate fertilizer being made and to convert the calcium silicate subsequently added into a salt of the mineral acid; mixing the fine calcium silicate with the thin slurry until the plastic state is reached, the amount of the calcium silicate used being sufficient to effect the desiccation of the mixture; and curing the plastic mixture until an apparently dry product results.

5. Step in the process of making a calcium phosphate fertilizer from a calcium-containing material, reactive with dilute phosphoric acid to produce the calcium phosphate fertilizer, and dilute phosphoric acid, which comprises incorporating a fine calcium silicate with a thin slurry consisting of a mixture of the fine calcium-containing material and the dilute phosphoric acid, containing at least 30% by weight of $H_3PO_4$, where the amount of the phosphoric acid used is that required to convert all of the calcium containing material into the available calcium phosphate fertilizer being made and to convert the calcium silicate subsequently added into available calcium phosphate, the amount of the calcium silicate used being sufficient to effect the desiccation of the thin slurry and form a plastic product.

6. Step in the process of making a calcium phosphate fertilizer from a calcium-containing material, reactive with dilute mineral acid to produce the calcium phosphate fertilizer, and dilute mineral acid, which comprises incorporating a fine calcium silicate with a thin slurry consisting of a mixture of the fine calcium-containing material and the dilute mineral acid, where the amount of the mineral acid used is that required to convert all of the calcium containing material into the available calcium phosphate fertilizer being made and to convert the calcium silicate subsequently added into a salt of the mineral acid, the amount of the calcium silicate used being sufficient to effect the desiccation of the thin slurry and form a plastic product.

7. Process of making dicalcium phosphate from a calcium silicate and dilute phosphoric acid which comprises mixing the fine calcium silicate and the dilute phosphoric acid, containing 30 to 40% by weight of $H_3PO_4$, until the thin slurry originally produced passes into a plastic state, the amount of the phosphoric acid being that required to convert the calcium silicate to dicalcium phosphate; and curing the plastic mixture until an apparently dry product results.

8. Process of making dicalcium phosphate from limestone, a calcium silicate and dilute phosphoric acid which comprises mixing the fine limestone and dilute phosphoric acid, containing 30 to 40% by weight of $H_3PO_4$ to produce a thin slurry, the amount of the phosphoric acid used being that required to convert all the limestone into dicalcium phosphate and to convert the calcium silicate subsequently added into dicalcium phosphate; mixing the fine calcium silicate with the thin slurry until a plastic state is reached, the amount of the calcium silicate slag being between 15 and 25% by weight of the limestone used; and curing the plastic mixture until an apparently dry product results.

WALTER H. MacINTIRE.